United States Patent [19]

Ormiston et al.

[11] Patent Number: 4,671,740
[45] Date of Patent: Jun. 9, 1987

[54] CERAMIC COATED ABRASION RESISTANT MEMBER AND PROCESS FOR MAKING

[75] Inventors: Thomas J. Ormiston; Dean A. Rulis, both of Hillsboro, Oreg.

[73] Assignee: Wilbanks International, Inc., Hillsboro, Oreg.

[21] Appl. No.: 881,518

[22] Filed: Jun. 30, 1986

Related U.S. Application Data

[63] Continuation of Ser. No. 627,277, Jul. 2, 1984, abandoned, which is a continuation of Ser. No. 387,039, Jun. 10, 1982, abandoned.

[51] Int. Cl.$^4$ ............................................. F04D 29/02
[52] U.S. Cl. .............................. 416/241 B; 416/224; 415/214; 428/447
[58] Field of Search ............... 416/223 R, 224, 229 R, 416/241 R, 241 B, 241 A; 415/214, 208; 428/29, 416, 447, 450

[56] References Cited

U.S. PATENT DOCUMENTS

| | | | |
|---|---|---|---|
| 3,032,316 | 5/1962 | Kramer | 416/241 |
| 3,122,883 | 3/1964 | Terner | 416/229 |
| 3,144,349 | 8/1964 | Swingler et al. | 416/241 |
| 3,607,607 | 9/1971 | Beninga | 428/49 |
| 3,608,976 | 9/1971 | Zugelder | 416/229 |
| 3,825,371 | 7/1974 | Roder et al. | 416/224 |
| 3,952,939 | 4/1976 | Schilling et al. | 416/224 |
| 4,122,673 | 10/1978 | Leins | 415/200 |
| 4,124,732 | 11/1978 | Legar | 428/49 |
| 4,273,824 | 6/1981 | McComas et al. | 415/200 |
| 4,289,446 | 9/1981 | Wallace | 415/174 |
| 4,336,276 | 6/1982 | Bill et al. | 415/174 |
| 4,338,380 | 7/1982 | Erickson et al. | 416/241 B |
| 4,405,284 | 9/1983 | Albrecht et al. | 415/174 |
| 4,441,857 | 4/1984 | Jackson et al. | 416/236 R |
| 4,492,522 | 1/1985 | Rossmann et al. | 416/241 B |
| 4,494,287 | 1/1985 | Cruzen et al. | 416/241 B |

FOREIGN PATENT DOCUMENTS 57426 1/1953 France ............................. 416/241 B Primary Examiner—Robert E. Garrett
Assistant Examiner—John Kwon
Attorney, Agent, or Firm—Klarquist, Sparkman, Campbell, Leigh & Whinston

[57] ABSTRACT

A ceramic coated abrasion resistant member and method of making are described in which a plurality of thin plates of polycrystalline ceramic material of small size, for example, a square plate measuring 1.0 inch by 1.0 inch having a thickness less than 0.200 inch are bonded to a thicker substrate base member with a uniform layer of organic adhesive bonding material. The bonding material includes a thermosetting organic plastic adhesive and a coupling agent which forms covalent chemical bonds with the ceramic plates, base member and plastic adhesive. An organosilane, such as $\gamma$-aminopropyl trimethoxy silane, may be used as the coupling agent. The ceramic material may be selected from the group consisting of aluminum oxide, zirconium oxide, silicon carbide, silicon nitride, and spinel ceramic materials. The substrate member is preferably metal, such as steel and the plastic adhesive may be an epoxy resin. The ceramic coated abrasion resistant member may be an impeller blade such as the blades of a high speed fan for conveying coal dust or other abrasive particulate material through a conduit, or the blades of a pump impeller for pumping abrasive liquid. In the process for making the abrasion resistant member, the substrate base member and the ceramic plates are coated on the surfaces to be bonded with a thin layer of coupling agent of about one molecule thickness before they are bonded together with the thermosetting organic plastic adhesive.

19 Claims, 5 Drawing Figures

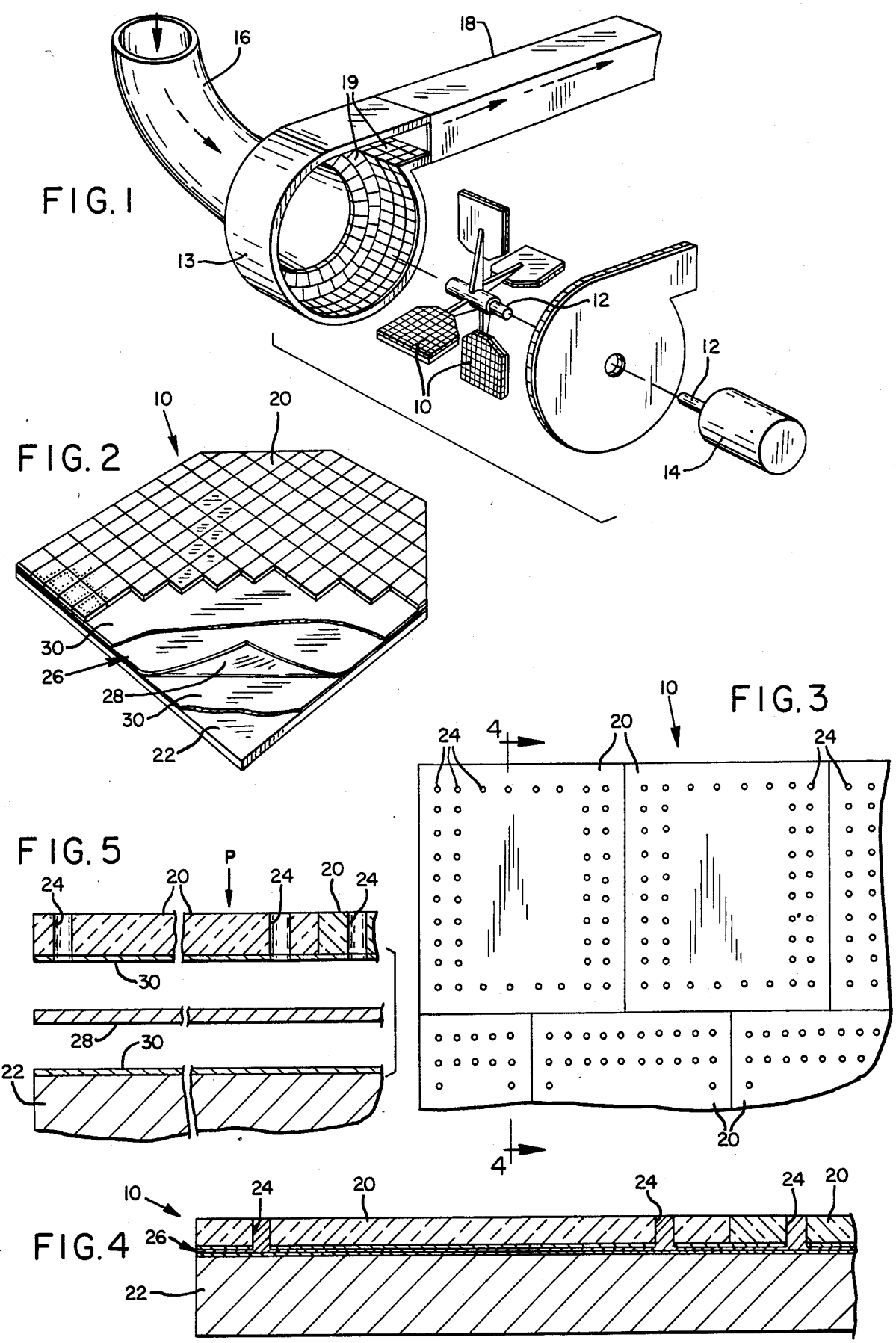

CERAMIC COATED ABRASION RESISTANT MEMBER AND PROCESS FOR MAKING

This application is a continuation, of application Ser. No. 627,277, filed July 2, 1984, now abandoned is a continuation, of application Ser. No. 387,039, filed June 10, 1982, now abandoned.

BACKGROUND OF INVENTION

The present invention relates generally to ceramic coated abrasion resistant members and methods of manufacture. In particular, the invention is directed to such abrasion resistant members and methods of manufacture in which a plurality of thin plates of polycrystalline ceramic material are bonded to a thicker substrate member with an adhesive bonding material including a thermosetting organic plastic adhesive and a coupling agent which forms covalent chemical bonds with the organic plastic adhesive, the substrate base member and the ceramic plates. An organosilane has been used as such coupling agent with good success. The resulting ceramic coated abrasion resistant member is lightweight, extremely resistant to impact damage, has a long wear life, and has a bond of extremely great strength which will withstand high stress. The method of manufacture of such ceramic coated abrasion resistant member in accordance with the present is both simple and inexpensive.

The ceramic coated abrasion resistant member of the present invention is especially useful as an impeller blade for a fan used to convey abrasive particles, such as coal dust, through a conduit or as a blade for a pump impeller which may be used for pumping abrasive liquid. However, the invention is also suitable for use as an abrasive resistant dynamic bearing member which contacts a moving abrasive member, such as the stationary dewatering elements contacting the pump conveyor wire of a Fourdrinier-type papermaking machine.

Previously, ceramic coated abrasion resistant members used as fan blades have been made by flame sprayed powder to produce a ceramic coating material on a metal substrate member. However, the resultant flame sprayed ceramic coatings are porous and of low density so that they are not sufficiently abrasion resistant and may even cause abrasion of any moving members in contact with them. Attempts have been made to bond a ceramic member to a metal substrate base member with epoxy resin or other thermosetting organic plastic adhesive. However, such bonds have failed because they are not of sufficient strength to resist the high stress such as created in a fan blade rotated at high speed. In order to solve this weak bonding problem, it has also been attempted to weld or solder plates of tungsten carbide ceramic material on the surface of a metal substrate base member. However, the resulting structure is extremely heavy and the bonds subject to metal fatigue so that under continued stress the solder joint eventually gives way causing the ceramic plates to come off the substrate. It is extremely dangerous when a ceramic plate breaks off a ceramic coated abrasion resistant member used as a high speed fan blade or impeller for a pump since the ceramic plate can easily cause extensive damage to the fan or pump and possible injury to workers. The above-mentioned problems have been overcome by the ceramic coated abrasion resistant member of the present invention.

Previously it has been proposed in the Handbook of Adhesives by Irving Skeist, 1977 edition on pages 640-652 to provide high strength bonds with an organosilane coupling agent to bond fiberglass to resin for forming a fiberglass and resin laminated used in the manufacture of boat hulls and for other applications including grinding wheels. However, such a coupling agent has not previously been used to form a ceramic coated abrasion resistant member including a plurality of thin ceramic plates bonded to a thicker substrate member of metal or reinforced plastic material to form a continuous ceramic coating of higher hardness in the manner of the present invention.

In the papermaking industry it has been proposed to bond foil dewatering elements of ceramic which engage the lower surface of the Fourdrinier wire in the papermaking machine to a metal substrate with epoxy resin or other thermosetting plastic adhesive. In this regard, see U.S. Pat. No. 4,184,915 of Metcalfe, issued Jan. 22, 1980. However, the metal support member for the foil is thinner than the ceramic member to which it is bonded, and is not a substrate member on which a ceramic coating is applied. Thus, the ceramic member is not a coating and does not conform in shape to the surface of the metal member to which it is bonded. As a result, the ceramic abrasion resistant foil member is much heavier and more expensive to manufacture than the ceramic coated abrasion resistant member of the present invention. Furthermore, the bond of such foil did not include a coupling agent for greater strength, but was designed to enable breaking of the bond for removal of ceramic segments from the metal member without disturbing the other segments bonded thereto.

SUMMARY OF INVENTION

It is therefore one object of the present invention to provide an improved ceramic coated abrasion resistant member which is lightweight and includes a plurality of ceramic plates of small size strongly bonded to a substrate by a uniform layer of organic plastic adhesive so that it is capable of withstanding extremely high stress.

Another object of the invention is to provide such an abrasion resistant member and method of manufacture in which a coupling agent is employed in the bonding material to form covalent chemical bonds with the surfaces of ceramic plates forming such coating, the substrate member and the organic plastic adhesive of the bonding material.

A further object of the invention is to provide such an abrasion resistant member and method of manufacture which are simple and inexpensive.

An additional object of the invention is to provide such an abrasion resistant member having a long wear life and high abrasion resistance as well as a high resistance to impact damage.

Still another object of the invention is to provide such an abrasion resistant member and method of manufacture in which the ceramic coating is formed by a plurality of thin ceramic plates which are bonded to a thicker substrate member of less hardness by an adhesive, including an organosilane coupling agent.

A still additional object of the invention is to provide an improved method of manufacture of such ceramic coated abrasion resistant member in which a layer of coupling agent is coated on the surface to be bonded of the ceramic plates and the substrate member before bonding them together with an organic plastic adhesive, to provide an extremely strong bond.

A still further object of the invention is to provide such an abrasion resistant member which is suitable for use as the blade of a fan for conveying abrasion resistant particles through a conduit or as the blade of a pump impeller for pumping abrasive liquid while such blades are rotated at high speed.

DESCRIPTION OF DRAWINGS

FIG. 1 is an exploded perspective view through a conduit of a conveying system for abrasive particles including a fan having ceramic coated abrasion resistant fan blades made in accordance with the present invention;

FIG. 2 is an enlarged perspective view of a fan blade used for the fan of FIG. 1 with parts broken away for greater clarity;

FIG. 3 is an enlarged plan view of a portion of the fan blade of FIG. 2;

FIG. 4 is a vertical section view taken along the line 4—4 of FIG. 3; and

FIG. 5 is a schematic view of the bonding step in a method of manufacture of the ceramic coated abrasion resistant member of FIGS. 1 to 4.

DESCRIPTION OF PREFERRED EMBODIMENT

As shown in FIG. 1, a fluid impeller means such as an induced draft fan including a plurality of fan blades 10 connected to a shaft 12 mounted within a housing 13 and driven by an electric motor 14 outside such housing. The fluid inlet of the fan housing is connected to an inlet conduit 16 and the fluid outlet of such housing is connected to an outlet conduit 18 which are tubular ducts of sheet metal through which an abrasive fluid, such as particles of coal dust, is transmitted in the airstream produced by the fan. The abrasive particles may also be grain, wood chips or other abrasive particles. Alternatively, the blades 10 can be impeller blades of a pump which pumps an abrasive liquid through the conduit 16 rather than abrasive particles. A layer 19 of ceramic bricks about one inch thick are fastened mechanically to the inner surface of the impeller housing 13 by metal studs welded thereto and extending through holes in such bricks to provide an abrasive resistant surface for the stationary housing. The impeller blades 10 are made in accordance with the present invention with a coating of ceramic material including of a plurality of thin ceramic plates 20 bonded to a substrate base member 22 of metal, reinforced plastic or other suitable support material to withstand high speed rotation in a stream of abrasive particles, as shown in FIGS. 2 and 4.

As shown in FIG. 3 the ceramic plates 20 are provided with a plurality of holes 24 extending therethrough for receiving adhesive bonding material to increase the strength of the bond between the ceramic plates and the substrate 22. The holes 24 may be arranged in any desired pattern, but are preferably provided in rows adjacent the edges of the ceramic plates surrounding an unapertured central area of such plate.

As shown in FIG. 4 a layer of adhesive bonding material 26 is provided between the ceramic plates 20 and the substrate 22 in order to bond the substrate to such ceramic plates. The bonding material 26 extends into the holes 24 in the ceramic plate to increase the strength of the bonds. The adhesive bonding material 26 includes a layer 28 of thermosetting organic plastic adhesive, such as an epoxy resin sold by Shell Chemical Company under the tradeness EPON 828 epoxy or by American Cyanamid Company under the name CY-BOND 3700, between thin films 30 of a coupling agent, which may be an organosilane. The coupling agent forms direct chemical bonds with the surfaces of the ceramic plates 20, and the substrate member 22, and direct covalent bonds to the thermosetting organic plastic adhesive layer 28.

As shown in FIG. 5, in the bonding step of a method of manufacture of the ceramic coated abrasion resistant member 10, the ceramic plates 20 and the substrate member 22 are both coated with a thin film of coupling agent 30 and then a layer 28 of a thermosetting organic adhesive is provided between the coated plate 20 and the coated substate 22 to bond these members together with the application of heat and pressure (P). The thermosetting organic adhesive and coupling agent also extend into the holes 24 in the ceramic plates 20 to strengthen the bond.

The ceramic plates 20 are of small size with a maximum length less than 2.0 inch and may be thin square plates about 1 inch by 1 inch having a thickness less than about 0.200 inch. Typically, the plates have a thickness on the order of 0.060 to 0.150 inch, for aluminum oxide ceramic. The substrate member 22 is much thicker than the ceramic plates, but its thickness depends upon the material from which the substrate is made. For example, with a suitable high-strength steel alloy, such as type 1018 carbon steel, the thickness may be on the order of about 0.312 inch which is sufficient for a blade substrate about 3 feed long by 2 feet wide which rotates at a tip speed of greater than 7000 feet per minute. However, if the fan blade is made of aluminum or other metal of less strength than steel, such thickness may increase up to about 0.500 inch. Many different types of crystalline ceramic material can be employed for the ceramic plates 20, including aluminum oxide, zirconium oxide, silicon carbide, silicon nitride, or spinel ceramic material.

A coupling agent 30 is applied to the ceramic plates 20 and the base member 22 as an extremely thin film or monolayer having a substantially uniform thickness about one molecule thick. Such monolayer is necessary for all of the coupling agent to form covalent chemical bonds with surfaces of the ceramic plates, the substrate 22 and the adhesive. With excess coupling agent greater than a monolayer, some of the coupling agent will not form covalent chemical bonds which will weaken the ceramic to metal bond. Such monolayers may be applied by wiping the surfaces with a cloth soaked in such coupling agent. An organosilane coupling agent, such as amino-silane, has been used as the coupling agent with good success where the base member 22 is steel and the ceramic plates 20 are of aluminum oxide. One suitable amino-silane is gamma γ-aminopropyl trimethoxy silane, such as that sold by Union Carbide Corporation under their tradename A-1100.

In a method of manufacture in accordance with the present invention the surface of the metal substrate 22 is first mechanically polished or ground to remove any oxide. This is followed by chemical etching to provide an active surface. The etching solution may consist by weight of 5% sodium diochromate, 16% sulfuric acid and 79% tap water. The etching solution is applied with cotton swabs on the surfaces of the small metal substrates for about 5 minutes, the larger substrate members are dipped in a heated bath of the solution of approximately 150° to 180° F. for about 15 minutes. After etching, the etched surface is rinsed in hot tap water at about 180° F. and dried with clean bleached paper toweling.

The cleaned surface of the metal substrate is then coated with a coupling agent which may be a solution of about 2% organosilane dispersed in a solution of methyl alcohol and water. One suitable solution for bonding with aluminum oxide ceramic plates 20, a steel substrate and epoxy resin organic plastic adhesive consists of 5 parts water 93 parts methyl alcohol and 2 parts of $\gamma$-aminopropyl trimethoxy silane. For maximum bond strength, it is important that only a monolayer of the coupling agent be applied, i.e. a thin film, having a thickness of 1 molecule. This is acccomplished by dampening a soft cloth and wiping it by hand once over the bonding surface. Of course, substrate member 22 can be made of metals other than steel, such as aluminum, copper, cobalt, silicon, nickel or tungsten. Alternatively, the substrate member 22 may be made of a non-metal such as fiberglass reinforced resin which gives increased flexibility for the impeller blade.

The ceramic plates 20 are prepared for coating by washing them in hot tap water of about 180° F., allowing them to air dry and then spreading them out over a flat surface. The ceramic chips are then wiped once with the same coupling agent which is used on the metal substrate to provide a monolayer of such coupling agent on the ceramic plates. Another technique for treating the surface of the ceramic plates is to dip the ceramic plates in an extremely dilute solution of organosilane on the order of 0.1 to 0.01% organosilane with the balance being water and methyl alcohol mixed in the precentages given above. The ceramic plates are dipped in the solution for approximately 1 to 5 seconds, withdrawn and allowed to drain dry by gravity after being removed from the solution.

As shown in FIG. 5, the bonding procedure for bonding the coated ceramic plates to the coated substrate includes forming the layer 28 by applying a uniform layer of thermosetting organic plastic adhesive, such as epoxy resin, between the coated surfaces of the ceramic plates and substrate which have previously been coated with the coupling agent. When using a liquid resin, it is best to apply a thin layer of resin on each member to be bonded shortly after coating it with the coupling agent. Since the liquid thermosetting organic plastic adhesive may be difficult to spread in uniform layers, it may be desirable to purchase a film of such adhesive preformed into a uniform layer of the desired thickness and partially cured so that it is self-supporting. Such a film can be positioned between the coated surfaces in place of the layers of liquid resins. After applying the thermosetting organic plastic adhesive, the two coated member 20 and 22 are urged together and held under uniform pressure while heated at about 250° F. temperature for one hour until the adhesive cures to form the layer 28. One way of accomplishing this and assuring uniform pressure is to assemble the substrate 22 having the ceramic plates 20 applied thereto with the layer 28 bonding adhesive therebetween and position such assembly within a flexible plastic bag. Then a vacuum is pulled on the bag so that the surrounding atmosphere at 14.7 psi presses the parts together at uniform pressure. In some instances, it may be necessary to position the bag within an autoclave to increase the external pressure above atmospheric pressure. The adhesive film 28 is applied by simply laying a piece of the film on top of the coupling agent coated surface of the substrate and setting the coated ceramic chips with their monolayer surface on top of the thermosetting organic plastic adhesive film covering the substrate. This assembly is then sealed in a plastic bag and the appropriate heat and pressure is applied to cure the adhesive.

Other coupling agents may be employed including those which are not organosilane compounds. For example, methacrylato chromic chloride can be employed as a coupling agent to bond polyester resin organic plastic adhesive to the ceramic plates and the metal substrate. The chromium atom at one end of the molecule of methacrylato chromic chloride reacts with an oxide surface of the ceramic plates, such as with aluminum oxide ceramic, and the oxide formed on the metal substrate by exposure to the air. The methacrylato radical in such molecule polymerizes with the vinyl linked resin of the polyester resin adhesive. However, nearly all metals and metal oxides including metal oxide ceramics are subject to the absorption of water when exposed to air. When water is present, there is no direct chemical bond between the polymer matrix and the metal or metal oxide so the adhesive bond is weak. Organosilane coupling agents are preferred because such absorbed water is removed from the adhered surface when the silane radical bonds to the metal oxide.

In addition to the metal oxide ceramics, such as aluminum oxide, other ceramics such as silicon carbide, boron nitride, lithium fluoride and spinel ceramic material will react with such organosilane compounds so that they may be used as the ceramic material of the ceramic plates. While many different organosilane compounds can be used as the coupling agent, it is preferable to use $\gamma$-aminopropyl trimethoxy silane when the organic plastic adhesive is epoxy resin or a methacrylate, such as polymethyl methacrylate, or other reactive linked polymers. Alternatively, when the organic plastic adhesive is vinyl polyester or a styrene, a vinyl triethoxy silane coupling agent may be employed.

It will be obvious to those having ordinary skill in the art that many changes may be made in the above-described preferred embodiments of the present invention. Therefore, the scope of the present invention should be determined by the following claims.

We claim:

1. An abrasion resistant impeller apparatus, comprising:

an impeller member of metal mounted for high speed rotation in an abrasive fluid for movement of said fluid;

a plurality of thin ceramic plates of greater hardness than said metal of said impeller member, having a maximum length less than two inches and having a thickness many times less than the length of said ceramic plates, said ceramic plates being positioned in a substantially continuous abutting relationship to form a substantially continuous abrasion resistant ceramic surface on said impeller member;

bonding means for forming ceramic to adhesive to metal bonds between said impeller member and said ceramic plates with an organic, nonelastomer adhesive bonding material chemically bonding said ceramic plates to said impeller member;

said bonding material including an organic plastic adhesive which is cured at elevated temperature and pressure above normal room temperature and pressure to provide a substantially uniform layer of adhesive contacting the ceramic plates and contacting substantially the entire surface of the impeller member covered by said plates.

2. An impeller apparatus in accordance with claim 1 in which the impeller member is the blade of a fan and which also includes a conveyor conduit for conveying abrasive particles and air through said fan and said conduit.

3. An impeller apparatus in accordance with claim 1 in which the ceramic plates have a length of about one inch and a thickness less than 0.200 inch.

4. An impeller apparatus in accordance with claim 2 in which the abrasive particles are coal dust.

5. An impeller apparatus in accordance with claim 1 in which the bonding material includes a coating of coupling agent for forming chemical bonds with said adhesive, said ceramic plates and said impeller member.

6. An impeller apparatus in accordance with claim 5 in which the ceramic plates are made of aluminum oxide ceramic, the adhesive is an epoxy resin and the coupling agent is an organosilane material.

7. An impeller apparatus in accordance with claim 6 in which the impeller member is made of steel and the coupling agent is an amino-silane material.

8. An impeller apparatus in accordance with 1 in which the ceramic plates have holes therethrough into which the bonding material extends.

9. An abrasion resistant fan blade for a conveyor of abrasive fluid, comprising:
a substrate base member;
a plurality of thin ceramic plates of polycrystalline ceramic material of greater hardness and less thickness than said base member, each plate having a maximum length less than two inches and having a thickness many times less than its length;
bonding means for bonding said ceramic plates to a surface of said base member so that said plates are positioned in substantially continuous abutting relationship to form a substantially continuous abrasion resistant ceramic coating on said surface;
said bonding means including an organic, nonelastomer plastic adhesive bonding material between said ceramic plates and said base member to form ceramic to adhesive to substrate bonds; and
said bonding material including an organic plastic adhesive which is cured at elevated temperature and pressure above ambient temperature and pressure to provide a substantially uniform layer of adhesive contacting the ceramic plates and substantially the entire surface of the base member covered by said plates.

10. An abrasion resistant member, comprising:
a substrate base member;
a plurality of thin ceramic plates of polycrystalline ceramic material of greater hardness and less thickness than said base member, each plate having a maximum length less than two inches and having a thickness many times less than its length, said ceramic plates being positioned in substantially continuous abutting relationship to form a substantially continuous abrasion resistant surface on said base member;
bonding means for bonding said ceramic plates to a surface of said base member;
said bonding means including nonelastomer adhesive bonding material between said ceramic plates and said base member to form ceramic to adhesive to substrate bonds; and
said bonding material including a thermosetting organic plastic adhesive and a coupling agent which forms chemical bonds with the organic plastic adhesive, said base member and said ceramic plates.

11. A member in accordance with claim 10 in which the organic plastic adhesive is cured at elevated temperature and pressure to provide a substantially uniform layer of adhesive contacting the ceramic plates and contacting substantially the entire surface of the base member covered by said plates.

12. A member in accordance with claim 10 in which the coupling agent is an organosilane.

13. A member in accordance with claim 11 in which the plastic adhesive is an epoxy resin.

14. A member in accordance with claim 10 in which the base member is made of metal.

15. A member in accordance with claim 11 in which the ceramic plates are made of a metal oxide ceramic material.

16. A member in accordance with claim 10 in which the ceramic material is selected from the group consisting of aluminum oxide, zirconium oxide, silicon carbide, and spinel ceramic material.

17. A member in accordance with claim 10 in which the ceramic plates are of a thickness less than about 0.200 inch.

18. A member in accordance with claim 10 in which the ceramic plates have hole therethrough and the bonding material extends into said holes.

19. A member in accordance with claim 10 in which the substrate member is made of reinforced synthetic organic plastic.

* * * * *

UNITED STATES PATENT AND TRADEMARK OFFICE
CERTIFICATE OF CORRECTION

PATENT NO. : 4,671,740
DATED : June 9, 1987
INVENTOR(S) : Thomas J. Ormiston, et al.

It is certified that error appears in the above-identified patent and that said Letters Patent is hereby corrected as shown below:

In the Specification

Column 1, line 39, "pump conveyor" should be --pulp conveyor--.

Column 2, line 65, "surface" should be --surfaces--.

Column 3, line 28, "shaft 12 mounted" should be --shaft 12 is mounted--.

Column 3, line 67, "tradeness" should be --tradename--.

Column 4, line 13, "substate" should be --substrate--.

Column 4, line 29, "3 feed long" should be --3 feet long--.

Column 5, line 11, "acccomplished" should be --accomplished--.

Column 5, lines 29 and 30, "precentages" should be --percentages--.

Column 5, line 50, "member" should be --members--.

Column 6, line 21, "adhered" should be --adherent--.

UNITED STATES PATENT AND TRADEMARK OFFICE
CERTIFICATE OF CORRECTION

PATENT NO. : 4,671,740

DATED : June 9, 1987

INVENTOR(S) : Thomas J. Ormiston, et al.

It is certified that error appears in the above-identified patent and that said Letters Patent is hereby corrected as shown below:

In the Claims

Claim 18, column 8, line 43, "hole" should be --holes--.

Signed and Sealed this

Sixth Day of October, 1987

Attest:

DONALD J. QUIGG

Attesting Officer

Commissioner of Patents and Trademarks